Feb. 23, 1926.
C. J. CONNORS
CHAIN
Filed March 20, 1923
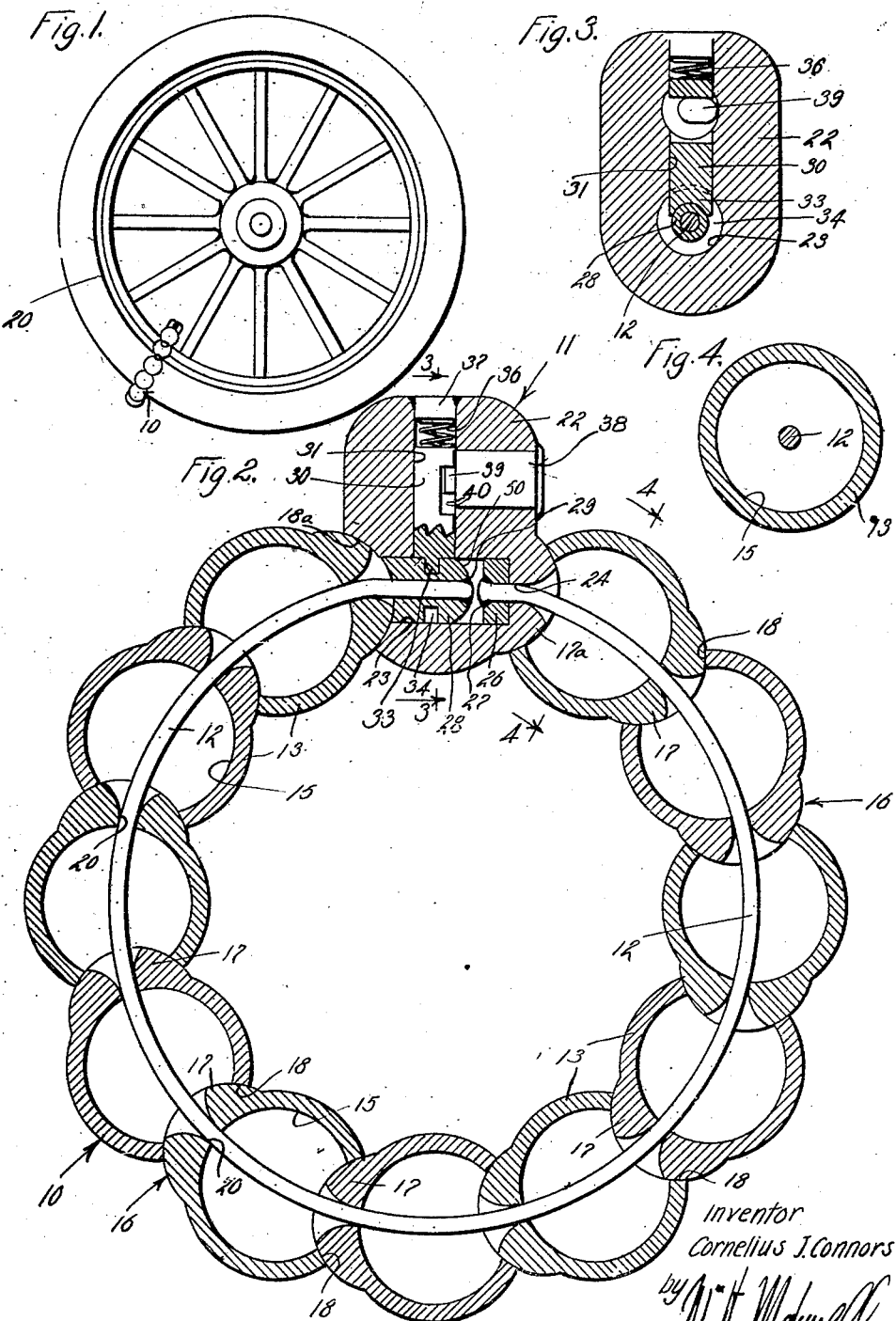
Inventor
Cornelius J. Connors
by his Attorney Patented Feb. 23, 1926.

1,574,066

UNITED STATES PATENT OFFICE.

CORNELIUS J. CONNORS, OF LOS ANGELES, CALIFORNIA.

CHAIN.

Application filed March 20, 1923. Serial No. 626,332.

*To all whom it may concern:*

Be it known that I, CORNELIUS J. CONNORS, a citizen of the United States, and a resident of Los Angeles, county of Los Angeles, State of California, have invented new and useful Improvements in Chains, of which the following is a specification.

This invention has to do, generally, with a chain, and it is an object of the invention to provide a device of this character which is simple and strong.

The chain, or flexible device, provided by this invention, is suitable for use in various situations, particularly where it is desirable to have a device which is strong and difficult to cut or break.

I have herein set forth a typical application of my invention, it being understood, of course, that this application is merely one of many, and that the broader aspects of the invention are not to be considered in any way limited to this or any other specific application.

An object of my invention is to provide a chainlike structure, which includes a member extending continuously longitudinally of the structure, and a plurality of relatively movable blocks which protect said member.

Another object of the invention is to provide a chainlike structure, having a member extending longitudinally of it, blocks arranged on said member so that they are relatively movable, and means protecting the member at the points of joinder of the blocks.

Another object of this invention is to provide a simple, strong and reliable means for joining the ends of a chain, or the like.

It is another object of this invention to provide a wheel-lock embodying the various phases of the invention in a form and combination particularly suitable for this purpose.

The various objects and features of the invention will be best and more fully understood from the following detailed description of a typical form and application of the invention, throughout which reference is had to the accompanying drawings, in which:

Fig. 1 is a side elevation of a typical vehicle wheel, having thereon a lock including the present invention;

Fig. 2 is an enlarged detail sectional view of the device provided by this invention;

Fig. 3 is a detail sectional view, taken as indicated by line 3—3 on Fig. 2; and Fig. 4 is a detail sectional view, taken as indicated by line 4—4 on Fig. 2.

In the drawings, numeral 10 designates, generally, a flexible chainlike structure or device, and numeral 11 designates means for releasably connecting or locking together the ends of the chain. In accordance with my invention, the chain 10 includes a tie member 12, and a plurality of blocks 13 carried on the tie member. The tie member is a more or less flexible member and extends longitudinally of the chain throughout its length. The tie member may, as far as the broader aspects of my invention are concerned, be a cord or cable, for instance, a wire cable, or it may be in the form of a strand of wire, as I have shown in the drawings. In the case of a wheel locking device, such as I herein disclose, it is desirable to form the tie member of a piece of spring wire, or the like, which has a normal curvature, about as is shown in Fig. 2, so that it normally yieldingly holdes the ends of the chain together or closed. It will be obvious, of course, that the exact form or nature of the tie member will be determined largely by the particular use to which the structure is put. It will be obvious from the following description that the tie member is not subject to any torsional or transverse strains, but has to withstand only tensile strains, so, therefore, it need not be particularly heavy.

The blocks 13 are arranged on or over the tie 12 so that they are independently movable relative to each other, and to the tie. In the drawings I have shown the blocks 13 spherically shaped and all of uniform size and shape. In accordance with the broader aspects of the invention, however, the blocks may be in any suitable shape and may vary in size and shape throughout different parts of the chain if so desired. The blocks 13 have central openings 15, so that they are practically hollow spheres and are considerably lighter than they would be if solid. There are openings at opposite sides of the blocks to pass the tie, as will be hereinafter more fully described. In accordance with the invention, the blocks 13 are more or less loosely carried on the tie member so that they can be freely slid longitudinally on it or can be freely rotated on it.

In accordance with my invention, I provide means 16 at the points of joinder of the blocks 13 to protect the tie 12. I provide a construction which covers the tie between the blocks and yet does not interfere with the flexibility or operation of the chain. In accordance with the preferred form of my invention, the means 16 at each point of joinder of the blocks 13 includes a projection 17 extending from one of the blocks into a socket 18 in the other block. The projection 17 is spherically shaped or curved, as I have clearly illustrated in Fig. 2, and the socket 18 is correspondingly shaped so that the projection seats closely in it and is freely movable in any direction. It may well be said that the projection and socket form a ball and socket connection between the blocks. It is desirable to make the projections comparatively large, that is, of comparatively large radius, and to form the sockets so that the projections extend rather far into them. By making the sockets rather large they form large openings in the blocks to freely pass the tie member. In accordance with the preferred form of construction, I provide each block 13 with a socket and a projection and locate the socket and projection at substantially diametrically opposite points. However, it will be obvious that the invention might be carried out by forming some of the blocks with two projections and others with two sockets.

There are openings 20 through the blocks at the projections, only sufficiently large to pass the tie with working clearance. It is preferred that the outer portions of the openings 20 be somewhat enlarged, as I have clearly shown in Fig. 2, so that each block has only a single point of contact with the tie and so that there is no tendency for the tie to shear off when the chain is flexed. From the foregoing description, and from inspection of the drawings, it will be obvious that the projections 17 and sockets 18 may be designed and proportioned so that the chain has the desired flexibility and so that they positively prevent the chain from being flexed beyond a certain point. In other words, the form of means 16, provided by my invention, also forms stop means for positively limiting the range of flexibility of the chain. In practice the range of flexibility of the chain may be varied by varying the size of the projections and sockets. The blocks 13 and protecting means 16, together completely encase or cover the tie 12 so that it cannot be reached from the outside of the chain, and is completely concealed from view. Further, the tie member is carried in or by the several blocks so that it will flex or bend substantially uniformly throughout its length and is never subject to shearing action. The projections 17 on the blocks are particularly effective in protecting the tie at the points of joinder of the blocks and are sufficiently heavy and thick so that it is practically impossible to cut through them in order to reach the tie. It will be obvious, of course, that the blocks 13 may be made sufficiently heavy and strong that it is practically impossible to crush them or to cut through them in order to reach the tie.

It will be obvious, of course, that the ends of the tie may be held or secured to the end blocks or other parts at the end blocks in any suitable manner so that the several blocks are held closely together and are positively prevented from becoming removed from the tie. In the present disclosure I have shown the means 11 for locking the ends of the tie together so that the chain 10 can be locked around an object, for instance, a tire and felloe 20 of a wheel. The locking means 11, which I have disclosed in the drawings, includes a block 22 having one end of the tie 12 permanently secured to it and the other end of the tie adapted to be detachably connected with it. The block 22 has a comparatively large opening 23 extending into it from one side, and a comparatively small opening 24 extending into it from the other side so that it joins the large opening 23. In the present form of the invention, I provide a projection 17$^a$ on the exterior of the block 22 at one of the openings and provide a socket 18$^a$ in the block 22 at the other opening. The projection 17$^a$ is adapted to extend into the socket of one of the end blocks 13, while the socket 18$^a$ is adapted to receive the projection 17, of the other end block. The end of the tie 12, that is permanently secured to the block 22, extends through the small opening 24 into the large opening 23. A sleeve 26 is tightly carried in the inner end of the large opening 23 and is secured to the end of the tie 12. The sleeve 26 and tie 12 may be secured together by welding at 27. The sleeve 26 forms an enlargement on the end of the tie 12 within the large opening so that it cannot possibly pull out through the small opening.

The end of the tie, which is adapted to be detachably connected with the block 22, carries a sleeve 28 adapted to slidably fit into the large opening 23. The sleeve 28 is permanently connected on the end of the tie 12, as by welding the sleeve and tie together at 29. It will be obvious, of course, that the sleeve 28 retains the blocks on the tie and how it can be secured on the end of the tie so that the blocks are held together with the desired tightness on the tie. Further, with this construction, the chain may be very easily and economically made the desired length by stringing the proper number of blocks on the tie and then securing the sleeve 28 on the tie.

In accordance with my invention, I provide means for locking the sleeve 28 in the opening 23 so that the chain is positively locked in the form of a loop. The particular locking means that I have chosen to illustrate in the drawings includes a plunger 30 slidably carried in an opening 31 in the block 22 and is provided with a projection 33 adapted to fit into a notch or annular groove 34 formed in the sleeve 28. The plunger 30 is normally yieldingly held in position where the projection 33 extends into the opening 23 so that it will extend into the notch 34 by a spring 36. The spring 36 is arranged between the outer end of the plunger 30 and a plug 37 welded or otherwise positively fixed in the outer end of the opening 31. I mount a suitable locking mechanism—for instance, a tumbler lock, in the block 22 so that it has an arm 39 which operates in a notch 40 in one side of the plunger 30 to prevent rotation of the plunger in the opening and to limit the amount the plunger is moved inwardly by the spring 36. The locking mechanism is operable to retract the plunger so that the projection 33 is withdrawn from the notch 34 to release the sleeve 28. In practice the outer end 50 of the sleeve 28 is rounded and the projection 33 is also suitably rounded so that the plunger is depressed when the sleeve is arranged in the opening 23, causing the device to lock without manipulation of the lock 38. However, to actuate the plunger in order to release the sleeve it is necessary to operate the lock 38 with a key in order to turn the arm 39. In practice I prefer to design the block 22 so that it is neat and sightly and is as strong as any other part of the device.

Having described only a typical preferred form of my invention I do not wish to limit myself to the specific details hereinabove set forth but wish to reserve to myself any changes or variations that may appear to those skilled in the art or fall within the scope of the following claims.

Having described only a preferred form of my invention, I claim:

1. A chain including, a tie, a plurality of hollow spherical blocks carried on the tie, and means protecting the tie at the points of joinder of the blocks.

2. A chain including, a tie, a plurality of blocks carried on the tie so that each block has only a single line of contact with the tie, and means protecting the tie at the points of joinder of the blocks.

3. A chain including, a plurality of hollow blocks each having a projection extending from one side and a socket in the other side, the projections and sockets being comparatively large and there being a comparatively small opening through each block at the projection, and a tie carrying the blocks and extending through the blocks and sockets with substantial clearance and through the small openings with working clearance.

In witness that I claim the foregoing, I have hereunto subscribed my name this 10th day of March, 1923.

CORNELIUS J. CONNORS.